United States Patent [19]

Harman

[11] 3,899,502

[45] Aug. 12, 1975

[54] 1,2,4-THIADIAZOL-3,5-DIYL-SULFENAMIDES

[75] Inventor: Marion W. Harman, Dunbar, W. Va.

[73] Assignee: Monsanto Company, St. Louis, Mo.

[22] Filed: May 14, 1973

[21] Appl. No.: 359,978

[52] U.S. Cl............ 260/302 SD; 260/5; 260/243 B; 260/247.1; 260/293.63; 260/785; 260/786
[51] Int. Cl............................................. C07d 91/60
[58] Field of Search...... 260/302 SD, 247.1, 293.63, 260/243 B

[56] References Cited
UNITED STATES PATENTS
2,765,289   10/1956   Fields et al. .................. 260/302 SD OTHER PUBLICATIONS
Ignatov et al., Chem. Abstracts, 76:59539 (1972).

Primary Examiner—Richard J. Gallagher

[57] ABSTRACT

1,2,4-Thiadiazol-3,5-diyl-sulfenamides and thiosulfenamides of the formula

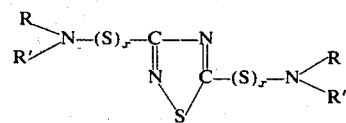

in which x is one or two, R and R' are hydrogen, alkyl, aralkyl, cycloalkyl, or together with the nitrogen atom to which they are attached form a heterocyclicamino radical are excellent accelerators and vulcanizing agents for the vulcanization of rubber.

7 Claims, No Drawings

1,2,4-THIADIAZOL-3,5-DIYL-SULFENAMIDES

BACKGROUND OF THE INVENTION

This invention relates to di(sulfenamides) and di(thiosulfenamides) of 1,2,4-thiadiazoles.

Many azole sulfenamides are known, for example substantial quantities of benzothiazole sulfenamides are used as accelerators in the vulcanization of rubber. Attempts at replacing the benzothiazole radical with other azole moieties have not been commercially successful either because the proposed azole intermediates were too expensive or because the resulting sulfenamide failed to possess adequate vulcanization properties, or both. A class of 1,2,4-thiadiazole sulfenamides has been discovered which are potentially inexpensive and exhibit adequate processing safety and potent accelerator activity.

SUMMARY OF THE INVENTION

According to this invention, compounds characterized by the formula

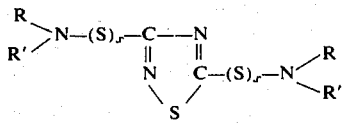

in which x is one or two, R and R' independently are hydrogen, alkyl of 1–8 carbon atoms, aralkyl of 7–10 carbon atoms, cycloalkyl of 5–8 carbon atoms, or R and R' together with the nitrogen atom to which they are attached form a heterocyclicamino radical of 4–8 carbon atoms are excellent accelerators and vulcanizing agents for rubber. A preferred group of compounds comprises compounds in which R is hydrogen and R' is alkyl, aralkyl or cycloalkyl and especially important members of this group are compounds in which R is tert-butyl, benzyl or cyclohexyl. A more preferred group of compounds comprises compounds in which R and R' along with the nitrogen atom form a heterocycle and especially compounds with heterocyclicamino radicals containing six ring members. Compounds in which x is one are accelerators for the vulcanization of rubber and compounds in which x is two are accelerators and vulcanizing agents meaning that they accelerate the vulcanization of rubber in the presence of other vulcanizing agents and will cross-link rubber by themselves when other vulcanizing agents are not present.

The terms as used herein and in the claims mean as follows: Alkyl means a branched or unbranched saturated acyclic radical derived by removal of one hydrogen atom from an alkane. Alkyl radicals of 1–8 carbon atoms are satisfactory, for example, methyl, ethyl, propyl, isopropyl, n-butyl, sec-butyl, isobutyl, tert-butyl, pentyl, hexyl, 1-methylhexyl, heptyl, and octyl. Aralkyl means phenyl substituted alkyl with radicals of 7–10 carbon atoms being satisfactory and benzyl being preferred. Other aralkyl radicals are α-methylbenzyl, α,α-dimethylbenzyl, xylyl, phenethyl, phenylpropyl and phenylbutyl. Cycloalkyl means a saturated cyclic radical derived by removal of one hydrogen atom from a cycloalkane. Examples of satisfactory cycloalkyl radicals are cyclopentyl, cyclohexyl, 2-methylcyclohexyl, 4-methylcyclohexyl, cycloheptyl, and cyclooctyl. Heterocyclicamino means the radical derived by removal of hydrogen from the nitrogen atom of a cyclic amine. Thus, R and R' are joined to each other and along with the nitrogen atom form a heterocyclic ring. It is understood that R and R' may be joined to each other through carbon forming a mono or bicyclic alkylene radical or may be joined to each other through oxygen or sulfur forming a single divalent radical attached to the nitrogen comprising two alkylene radicals interrupted by oxygen or sulfur. Examples of satisfactory heterocyclicamino radicals are pyrrolidinyl, 2,5-dimethylpyrrolidinyl, piperidino, 4-methylpiperidino, 2,6-dimethylpiperidino, 2,4,6-trimethylpiperidino, 2-ethylpiperidino, morpholino, thiomorpholino, 2,6-dimethylmorpholino, hexahydro-1H-azepin-1-yl and azabicyclo(3.2.2)non-3-yl.

Illustrative examples of compounds of the invention are: 3,5-di(N-methylaminothio)-1,2,4-thiadiazole, 3,5-di(N,N-dimethylaminothio)-1,2,4-thiadiazole, 3,5-di(N-ethylaminothio)-1,2,4-thiadiazole, 3,5-di(N,N-diethylaminothio)-1,2,4-thiadiazole, 3,5-di(N-isopropylaminothio)-1,2,4-thiadiazole, 3,5-di(N,N-diisopropylaminothio)-1,2,4-thiadiazole, 3,5-di(N-tert-butylaminothio)-1,2,4-thiadiazole, 3,5-di(N-benzylaminothio)-1,2,4-thiadiazole, 3,5-di(N-cyclohexylaminothio)-1,2,4-thiadiazole, and the corresponding thiosulfenamides.

Further illustrative examples of compounds of the invention are 3,5-di(pyrrolidinylthio)-1,2,4-thiadiazole, 3,5-di(2,5-dimethylpyrrolidinylthio)-1,2,4-thiadiazole, 3,5-di(piperidinothio)-1,2,4-thiadiazole, 3,5-(2,6-dimethylmorpholinothio)-1,2,4-thiadiazole, 3,5-di(hexahydro-1H-azepin-1ylthio)-1,2,4-thiadiazole, 3,5-(azabicyclo(3.2.2)non-3-ylthio)-1,2,4-thiadiazole, 3,5-di(pyrrolidinyldithio)-1,2,4-thiadiazole, 3,5-di(2,5-dimethylpyrrolidinyldithio)-1,2,4-thiadiazole, 3,5-di(piperidinodithio)-1,2,4-thiadiazole, 3,5-di(2,6-dimethylmorpholinodithio)-1,2,4-thiadiazole, 3,5-di(hexahydro-1H-azepin-1-yldithio)-1,2,4-thiadiazole, and 3,5-di(azabicyclo(3.2.2)non-3-yldithio)-1,2,4-thiadiazole.

The sulfenamides of this invention are used in the same manner as conventional accelerators. They are incorporated into the rubber by addition to an internal mixer, such as a Banbury mixer, or they may be added to the rubber on a mill. The fully compounded stocks are then heated to effect vulcanization. The amount of accelerator used varies depending upon the properties desired in the vulcanizates but generally is between 0.2–6.0 parts by weight per 100 parts by weight of rubber with 0.5–2.0 parts by weight per 100 parts by weight of rubber being the amount normally used. However, when the thiosulfenamides of the invention are used as vulcanizing agents, 2.0–5.0 parts by weight per 100 parts by weight of rubber are generally used.

The rubber stocks may include conventional compounding ingredients such as carbon blacks, zinc oxide, reinforcing silica, stearic acid, extender oils, phenolic antidegradants, phenylenediamine antidegradants, tackifiers, scorch inhibitors and bonding agents and may also include conventional accelerators. Elemental sulfur is commonly the vulcanizing agent but any sulfur-containing vulcanizing agent which at cure temperature or below releases sulfur in the form available to cross-link rubber is suitable. Illustrative sulfur vulcanizing agents are amine disulfides, for example, dimorpholinodisulfide, and polymeric polysulfides, for example, alkyl phenol disulfide.

The compounds of this invention can be used in any sulfur-vulcanizable diene rubber. Natural and synthetic rubbers and mixtures thereof are suitable. Synthetic rubbers include cis-4-polybutadiene, butyl rubber, ethylene-propylene terpolymers; polymers of 1,3-butadiene, polymers of isoprene, copolymers of 1,3-butadiene with other monomers, for example, styrene, acrylonitrile, isobutylene, and methylmethacrylate.

For the rubber stocks tested and described herein as illustrative of the invention, Mooney scorch times at the designated temperatures are determined by means of a Mooney plastometer. The time in minutes required for the Mooney reading to rise five or ten points above the minimum viscosity is recorded. Longer times on the Mooney scorch test are desirable because this indicates greater processing safety. Cure characteristics are determined at the designated temperatures by means of the Monsanto Oscillating Disk Rheometer which is described by Decker, Wise and Guerry in *Rubber World*, December 1962, page 68. From the Rheometer data, the maximum torque, R max., in Rheometer units is recorded. The increase in torque is a measure of the degree of vulcanization and is proportional to the cross-link density. The time $t_2$, in minutes for a rise of two Rheometer units above the minimum reading and the time, $t_{90}$, required to obtain a torque of 90% of the maximum are recorded. The difference, $t_{90}-t_2$, is a measure of the cure rate of the sample. Vulcanizates are prepared by press curing at the selected temperature for the time indicated by the Rheometer data to obtain optimum cure. The physical properties of the vulcanizates are measured by conventional methods.

DESCRIPTION OF PREFERRED EMBODIMENTS

The sulfenamides of this invention are conveniently prepared by the usual methods for preparation of sulfenamides. A general method is the alkaline oxidative condensation of an amine or ammonia with 3,5-dimercapto-1,2,4-thiadiazole. For example, oxidative condensation with ammonia gives 1,2,4-thiadiazol-3,5-diyl-sulfenamide. The latter may be used as an intermediate for the preparation of other sulfenamides by reaction with an amine to remove the $-NH_2$ as by-product ammonia and introduce the amine moiety in its place. Another method comprises reaction of 1,2,4-thiadiazol-3,5-diyl-sulfenyl chloride with amine in the presence of a hydrogen chloride acceptor. The intermediate sulfenyl chloride is prepared by chlorinating an alkali metal salt of 3,5-dimercapto-1,2,4-thiadiazole as described by Thaler and McDivitt, J. Org. Chem., Vol. 36, pp. 14–17, 1971. Also, the methods known for preparing thiosulfenamides are applicable to the preparation of the thiosulfenamides of this invention. In general, the methods involve insertion of sulfur into the sulfenamide corresponding to the desired dithiosulfenamide. A procedure hereinafter described comprises reacting 1,2,4-thiadiazol-3,5-diylsulfenamide and sulfur with amine.

1,2,4-thiadiazol-3,5-diyl-sulfenamide is prepared by the following procedure:

A solution of dipotassium salt of 2,6-dimercapto-1,2,4-thiadiazole is prepared by heating at 50°–60°C. for 30 minutes 145.8 grams of potassium cyanodithioimidocarbonate and 24.1 grams of sulfur in 400 ml. of water and 400 ml. of methanol. The solution is cooled to room temperature before use. The solution of dipotassium salt of 2,5-dimercapto-1,2,4-thiadiazole and a solution of 983 grams of sodium hypochlorite (13.64 g NaOCl/100 g $H_2O$) are simultaneously added with stirring over a one-hour period at 0°–5°C. to 6000 ml. of concentrated aqueous ammonium hydroxide (88.7 moles of $NH_4OH$). After stirring one additional hour at 0°–5°C., the reaction mixture is filtered, washed with water until neutral and air-dried at 25°–30°C. 1,2,4-thiadiazol-3,5-diyl-sulfenamide, m.p. 99°–100°C., is recovered in 67% yield. Chemical analysis gives 13.30% C, 2.17% H, 30.97% N and 53.56% S compared to 13.32% C, 2.24% H, 31.08% N and 53.36% S calculated for $C_2H_4N_4S_3$. Identification is confirmed by nuclear magnetic resonance spectral analysis.

Morpholine (78.6 grams) is added at 25°–30°C. in one portion to a stirred slurry comprising 54.1 grams of 1,2,4-thiadiazol-3,5-diyl-sulfenamide in 150 ml. of methanol. The mixture is stirred for 24 hours. A clear solution and ammonia evolution is observed in about one-half hour and after about three hours a precipitate forms. The mixture is cooled to 0°C., stirred for one-half hour at 0°–10°C. and the precipitate recovered by filtration and air-dried at 25°–30°C. 3,5-Di(morpholinothio)-1,2,4-thiadiazole, m.p. 106°–107°C. recrystallized from alcohol, is recovered in 91% yield. Chemical analysis gives 37.27% C, 4.95% H, 17.30% N, 10.45% O and 30.02% S compared to 37.47% C, 5.03% H, 17.48% N, 9.99% O 30.02% S calculated for $C_{10}H_{16}N_4O_2S_3$. Identification is confirmed by nuclear magnetic resonance spectral analysis.

A stirred slurry comprising 18 grams of 1,2,4-thiadiazol-3,5-diyl-sulfenamide, 6.4 grams of sulfur and 26.2 grams of morpholine in 75 ml. of methanol is heated at reflux (60°–65°C.) for 1.5 hours. After cooling to 30°C., 100 ml. of petroleum ether is added and mixture stirred for one hour at 25°–30°C. The solids are recovered by filtration and air-dried at 25°–30°C. 3,5-Di(morpholinodithio)-1,2,4-thiadiazole, m.p. 133°–134°C. recrystallized from isopropanol, is obtained in 81% yield. Chemical analysis gives 30.91% C, 4.02% H, 14.31% N, 9.09% O and 41.92% S compared to 31.23% C, 4.19% H, 14.57% N, 8.32% O and 41.69% S calculated for $C_{10}H_{16}N_4O_2S_5$. Identification is confirmed by nuclear magnetic resonance spectral analysis.

Ammonium chloride (26.8 g) and cyclohexylamine (62.5 g) in 250 ml. of isopropanol are added with stirring at room temperature to an aqueous solution of the sodium salt of isoperthiocyanic acid. The salt solution is previously prepared by digesting at 50°C. for 15 minutes xanthane hydride (37.6 g) and 25% NaOH (81 g; 0.505 mole). The mixture is stirred for 15 minutes during which time the temperature rises to 32°C. Sodium hypochlorite solution (485 ml., 0.885 mole, 13.59 g NaOCl/100 g $H_2O$) is added dropwise over a period of 135 minutes while maintaining the temperature between 40°–50°C. After determining by iodine-starch paper that the reaction is complete, the sample is acidified with dilute acetic acid and any excess NaOCl is neutralized by adding 5 g of sodium sulfite. The reaction mixture is stirred for one hour, cooled to 20°C., and 300 ml. of water is added dropwise. An oil layer forms which is extracted with 300 ml. of ether, washed with water, washed with 1% acetic acid solution, and then washed with water until neutral. The solvent is removed by heating in vacuo for 2 hours at 60°C. Forty grams of 3,5-di(cyclohexylaminothio)-1,2,4-thiadiazole, an amber solid, is recovered. Chemical analysis gives 16.75% N and 25.12% S compared to 16.26% N and 27.92% S calculated for $C_{14}H_{24}N_4S_3$.

The following tables illustrate the use of the compounds of this invention as accelerators and vulcanizing agents in the vulcanization of rubber. Natural rubber masterbatches are prepared by mixing the ingredients shown below in standard rubber mixing equipment. All parts are by weight. Santoflex 13 is N-(1,3-dimethylbutyl-N'-phenyl-p-phenylenediamine and Neozone D is N-phenyl-β-naphthylamine. Vulcanizable compositions are prepared by adding sulfur and sulfenamide of this invention or by just adding thiosulfenamide of this invention to portions of the masterbatch. The properties of the vulcanizable compositions and of the vulcanizates are determined as previously explained.

| Ingredient | Masterbatch 1 Parts by weight | Masterbatch 2 Parts by weight |
|---|---|---|
| Natural rubber | 100.0 | 100.0 |
| Zinc oxide | 3.0 | 3.0 |
| Stearic acid | 2.0 | 2.0 |
| ISAF Carbon black | 45.0 | — |
| HAF Carbon black | — | 50.0 |
| Hydrocarbon softener | 5.0 | 3.0 |
| Neozone D | — | 1.0 |
| Santoflex 13 | 2.0 | — |
| TOTAL | 157.0 | 159.0 |

TABLE I

| | Stock 1 | 2 | 3 | 4 | 5 |
|---|---|---|---|---|---|
| Masterbatch 1 | 157.0 | 157.0 | 157.0 | 157.0 | 157.0 |
| Sulfur | 2.0 | 2.0 | 1.0 | 1.0 | — |
| 3,5-Di(morpholinothio)-1,2,4-thiadiazole | 0.5 | — | 1.0 | — | — |
| 3,5-Di(morpholinodithio)-1,2,4-thiadiazole | — | 0.5 | — | 1.0 | 3.0 |
| Mooney Scorch at 250°F | | | | | |
| $t_5$, minutes | 44.7 | 25.5 | 35.7 | 21.2 | — |
| Rheometer data at 292°F | | | | | |
| R max. | 40.0 | 38.8 | 38.1 | 38.6 | 45.1* |
| $t_{90}$ | 39.8 | 36.0 | 28.3 | 26.0 | 5.1* |
| $t_{90}-t_2$ | 30.5 | 29.7 | 17.7 | 19.1 | 3.2* |
| Stress-Strain data at 292°F | | | | | |
| Cure time, minutes | 60 | 60 | 45 | 45 | — |
| 300% Modulus, psi | 1020 | 1000 | 1040 | 1040 | — |
| Ult. tensile, psi | 2550 | 2490 | 2650 | 2950 | — |

*Rheometer data at 328°F.

Stocks 1–4 illustrate the accelerating properties at different accelerator-sulfur ratios of a sulfenamide and thiosulfenamide of the invention. The data indicate that both are powerful accelerators of vulcanization and that the sulfenamide possesses superior processing safety. Stock 5 demonstrates that the thiosulfenamide is a potent vulcanizing agent in the absence of sulfur.

TABLE II

| | Stock 1 | 2 |
|---|---|---|
| Masterbatch 2 | 159.0 | 159.0 |
| Sulfur | 2.5 | 2.5 |
| 2-Mercaptobenzothiazole | 0.5 | — |
| 3,5-Di(cyclohexylaminothio)-1,2,4-thiadiazole | — | 0.5 |
| Mooney Scorch at 275°F | | |
| $t_{10}$ | 4.7 | 8.3 |
| Stress-Strain data at 292°F | | |
| Cure time, minutes | 60 | 60 |
| 300% modulus, psi | 2290 | 2100 |
| Ult. tensile, psi | 3800 | 3540 |

Stock 1 is a control stock containing a known accelerator and Stock 2 is a stock containing an accelerator of this invention. Comparison of the data indicates that 3,5-di(cyclohexylaminothio)-1,2,4-thiadiazole has about the same accelerator potency as the known accelerator but exhibits more processing safety. Similar evaluations with 1,2,4-thiadiazol-3,5-diyl-sulfenamide shows that it is a potent but somewhat scorchy accelerator. Vulcanizates prepared from vulcanizable compositions comprising styrene-butadiene rubber and compounds of this invention exhibit satisfactory physical properties.

Although the invention has been illustrated by typical examples, it is not limited thereto. Changes and modifications of the examples of the invention herein chosen for purposes of disclosure can be made which do not constitute departure from the spirit and scope of the invention.

The embodiments of the invention in which an exclusive privilege or property is claimed are defined as follows:

1. A compound of the formula

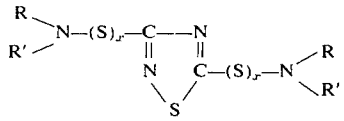

in which $x$ is one or two, R and R' independently are hydrogen, alkyl of 1–8 carbon atoms, aralkyl of 7–10 carbon atoms, cycloalkyl of 5–8 carbon atoms, or R and R' together with the nitrogen atom form pyrrolidinyl, 2,5-dimethylpyrrolidinyl, piperidino, 4-methylpiperidino, 2,6-dimethylpiperidino, 2,4,6-trimethylpiperidino, 2-ethylpiperidino, morpholino, thiomorpholino, 2,6-dimethylmorpholino, hexahydro-1H-azepin-1-yl or azabicyclo(3.2.2)non-3-yl.

2. The compound of claim 1 in which $x$ is one.

3. The compound of claim 2 in which R and R' are hydrogen.

4. The compound of claim 2 in which R is hydrogen and R' is cyclohexyl.

5. The compound of claim 2 in which

is morpholino.

6. The compound of claim 1 in which $x$ is two.

7. The compound of claim 6 in which

is morpholino.

* * * * *